US007024475B1

(12) United States Patent
Abaye et al.

(10) Patent No.: US 7,024,475 B1
(45) Date of Patent: Apr. 4, 2006

(54) PERFORMANCE MODELING OF A COMMUNICATIONS SYSTEM

(75) Inventors: Alireza Abaye, Plano, TX (US); Wing F. Lo, Plano, TX (US); Ralph R. Carsten, Carp (CA); Bruce Robertson, Ottawa (CA); Daniel Briere, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/557,451

(22) Filed: Apr. 24, 2000

(51) Int. Cl.
*G06F 15/173* (2006.01)

(52) U.S. Cl. .................... 709/224; 709/232; 703/13

(58) Field of Classification Search ............... 709/226, 709/236, 223–225, 232; 703/13
See application file for complete search history.

(56) References Cited

U.S. PATENT DOCUMENTS

| 5,754,831 | A * | 5/1998 | Berman ............... 703/13 |
| 6,028,846 | A * | 2/2000 | Cain .................. 370/250 |
| 6,279,039 | B1 * | 8/2001 | Bhat et al. ............ 709/226 |
| 6,430,615 | B1 * | 8/2002 | Hellerstein et al. ..... 709/224 |
| 6,442,141 | B1 * | 8/2002 | Borella et al. ......... 370/248 |
| 6,507,872 | B1 * | 1/2003 | Geshwind ............ 709/236 |
| 6,665,271 | B1 * | 12/2003 | Thomas et al. ........ 370/252 |

OTHER PUBLICATIONS

Jacobson et al., An Expedited Forwarding PHB, Jun. 1999, The Internet Society, p. 6, http://www.mirrors.wiretapped-.net/security/info/reference/ietf/rfc/rfc2598.txt.*
Ramakrishnan, K.K., et al., "The Ethernet Capture Effect: Analysis and Solution," Proceedings of IEEE 19th Conf. on Local Computer Networks, pp. 1-13, Oct. 1994.
International Telecommunication Union, ITU-T, "Series G: Transmission Systems and Media, Digital Systems and Networks: The E-Model, A Computational Model For Use in Transmission Planning," pp. 1-25, Dec. 1998.

* cited by examiner

*Primary Examiner*—Patrice Winder
(74) *Attorney, Agent, or Firm*—Trop, Pruner & Hu, P.C.

(57) ABSTRACT

A modeling tool that is executable in a system includes a modeling application that is capable of deriving a predicted quality of communications in a represented communications system. A user may create a representation of a target communication system by using icons representing different network components to build the representation in a user interface. Each of the network components is associated with one or more performance parameters, such as packet delay, packet loss, and jitter for packet-based network components. An overall performance parameter, such as an overall packet delay, overall packet loss, and overall jitter may be derived based on the performance parameters for each of the network components. From the overall performance parameters, the expected or predicted performance of the target communications system may be determined by using an E-model in one arrangement.

28 Claims, 6 Drawing Sheets

PERFORMANCE MODELING OF A COMMUNICATIONS SYSTEM

BACKGROUND

The invention relates to performance modeling of a communications system, such as one that provides for communications of streaming data.

Traditional telephony communications are routed through circuit-switched networks between telephony end stations. An example of a circuit-switched network includes the public switched telephone network (PSTN). Telephony end stations may be connected through telephone lines to a central office system, or alternatively, the telephony end stations may be connected to a telephone exchange system that in turn is connected to the central office system or to other telephone exchange systems. Examples of telephone exchange systems include key telephone systems and private branch exchange (PBX) systems. In a circuit-switched network, end stations are provided dedicated end-to-end circuit connections for the duration of each call over which voice data may be communicated.

With improvements in the bandwidth and speed associated with packet-based networks, voice and other forms of streaming data communications over packet-based networks have become possible. Packet-based networks may be connection-oriented, such as Asynchronous Transfer Mode (ATM) or Frame Relay networks, in which virtual connections or circuits are provided between end stations to communicate the streaming data. Another type of packet-based network is the packet-switched, connectionless network, such as an Internet Protocol (IP) network.

In a packet-switched network, packets sent from a source may traverse different paths to arrive at the final destination. Such packets share the network bandwidth with conventional non-streaming data (such as data associated with electronic mail, file transfer, web access, and other traffic). The packets that are routed over separate paths are reassembled at the destination. Transmission speeds of the various paths may vary depending upon the usage of the network paths over which the packets are being transported. Also, during heavy traffic conditions, packets may be delayed and lost. During heavy usage of packet-switched networks, packet delays and losses may cause poor performance of voice communications. Voice data packets that are lost or delayed due to inadequate or unavailable capacity of packet-switched networks may result in gaps, silence, and clipping of audio at the receiving end.

Thus, a need exists for a method and apparatus that can determine the quality level of a communications system including packet-based networks.

SUMMARY

In general, according to one embodiment, a method of determining performance of a communications system includes storing representations of plural components of the communication system, the components including a packet-based network and at least one network device. One or more performance parameters are assigned for each of the components. A quality indication of the communications system is derived based on the performance parameters of the components.

Some embodiments of the invention may include one or more of the following advantages. The expected performance of a target communications system including packet-based networks may be estimated. The ability to estimate system performance allows for proper planning when deploying voice and other forms of communications in packet-based networks. For example, appropriate equipment may be selected for a planned capacity. Also, to the extent that an enterprise needs the services of Internet service providers to gain access to a public network, the enterprise may negotiate the desired level of service. By properly planning a network infrastructure for various communications services (including voice and data services), the quality of service provided to users may be enhanced.

Other features and advantages will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

Figure 1:
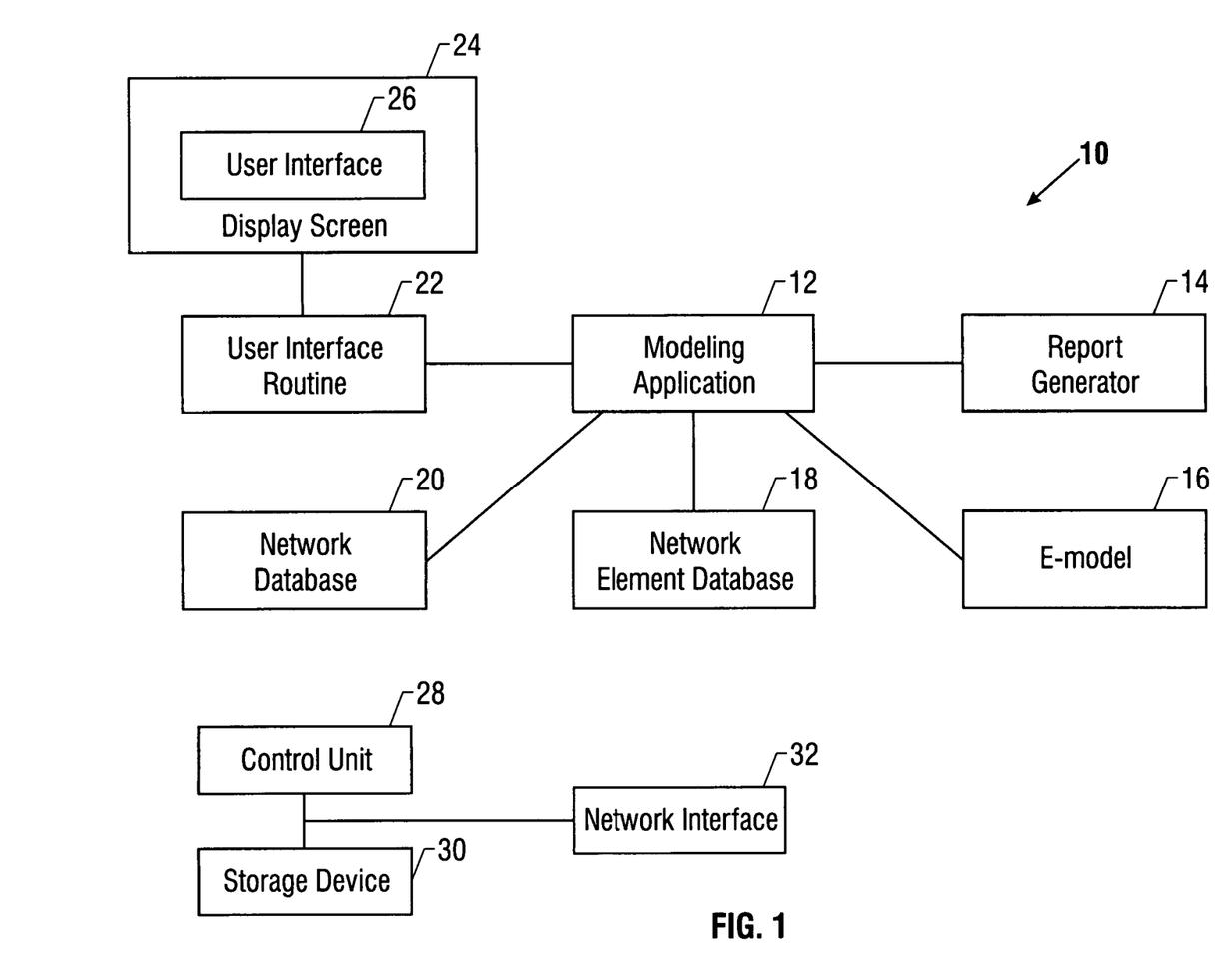
FIG. 1 is a block diagram of a system including a modeling tool in accordance with one embodiment.

Referring to FIG. 1, a system 10 that includes a modeling tool for communications systems in accordance with an embodiment is illustrated. The modeling tool may be used to model a communications system that includes a packet-based network and various network elements. Additionally, the communications system 10 may also include circuit-switched networks and elements. Based on performance parameters associated with the networks and the network elements, the quality of service that may be provided by the communications system may be predicted. The predicted quality can then be used for planning purposes in deploying various forms of communications (including audio, video, and data) in the communications systems. Based on the expected capacity, appropriate equipment may be used and the required service levels negotiated with service providers (e.g., Internet service providers) or carriers.

The system 10 may be implemented on one of many types of platforms, such as desktop computer systems, portable systems, and other systems. The arrangement of the system 10 as shown in FIG. 1 is for illustrative purposes only. Other arrangements are possible in other embodiments.

The modeling tool running in the system 10 includes a modeling software application 12 that may interact with various other modules. A user interface 26 presented on a display screen 24 is provided by a user interface routine 22 to allow a user to run the modeling application 12 and to access the various features offered by the modeling application 12. A network element database 18 includes a database of the various network elements or components that may exist in a communications system. Examples of such network components include end stations and terminals, packet-based networks, circuit-switched networks, switches, gateways, and so forth.

A representation of a communications system may be created in the user interface 26 using the network components stored in the network element database 18 and links between those network components. The created representation of the communications system may be stored in a network database 20. Based on the created representation of the communications system, a quality indication may be provided by the modeling application 12. In one embodiment, the modeling application 12 may cooperate with an E-model routine 16 to calculate a rating factor that indicates a subjective perception of the quality of streaming data (e.g., voice) communications in the communications system. The calculated results are communicated to a report generator 14, which can present the results on the display screen 24, store a report, or print the report to a printer.

An E-model is a computational model developed by the International Telecommunication Union (ITU), with one version described in the G.107 Recommendation, entitled "The E-Model, a Computational Model for Use in Transmission Planning," dated in 1998. The E-model allows the calculation of a rating factor (R) that is based on a number of terminal and network parameters that are known to impact the subjective perception of voice quality. The G.107 Recommendation also includes a guide for relating values of R to qualitative measures of voice quality transmission, including Mean Opinions Score (MOS). Higher values for R and MOS correspond to better voice quality and higher quality of service (QoS). Other qualitative measures of voice quality may also be derived from the R rating factor.

The various software layers in the system 10, such as the modeling application 12, E-model routine 16, report generator 14, and user interface routine 22, may be executable on a control unit 28. The instructions of such software modules may be stored in a storage device 30. In addition, the network database 20 and network element database 18 may also be stored in the storage device 30. A network interface 32 may also be included in the system 10 to enable data communications, such as results of the quality of service calculations, to another network device.

In the user interface 26, a user may add or edit a representation of a network component stored in the network element database 18 as well as define links between the network components. The network components and interconnecting links may be represented as icons in the user interface 26. Such icons may be manipulated by the user to create a model of a communications system or to edit parameters associate with each of the represented network components.

Figure 2:
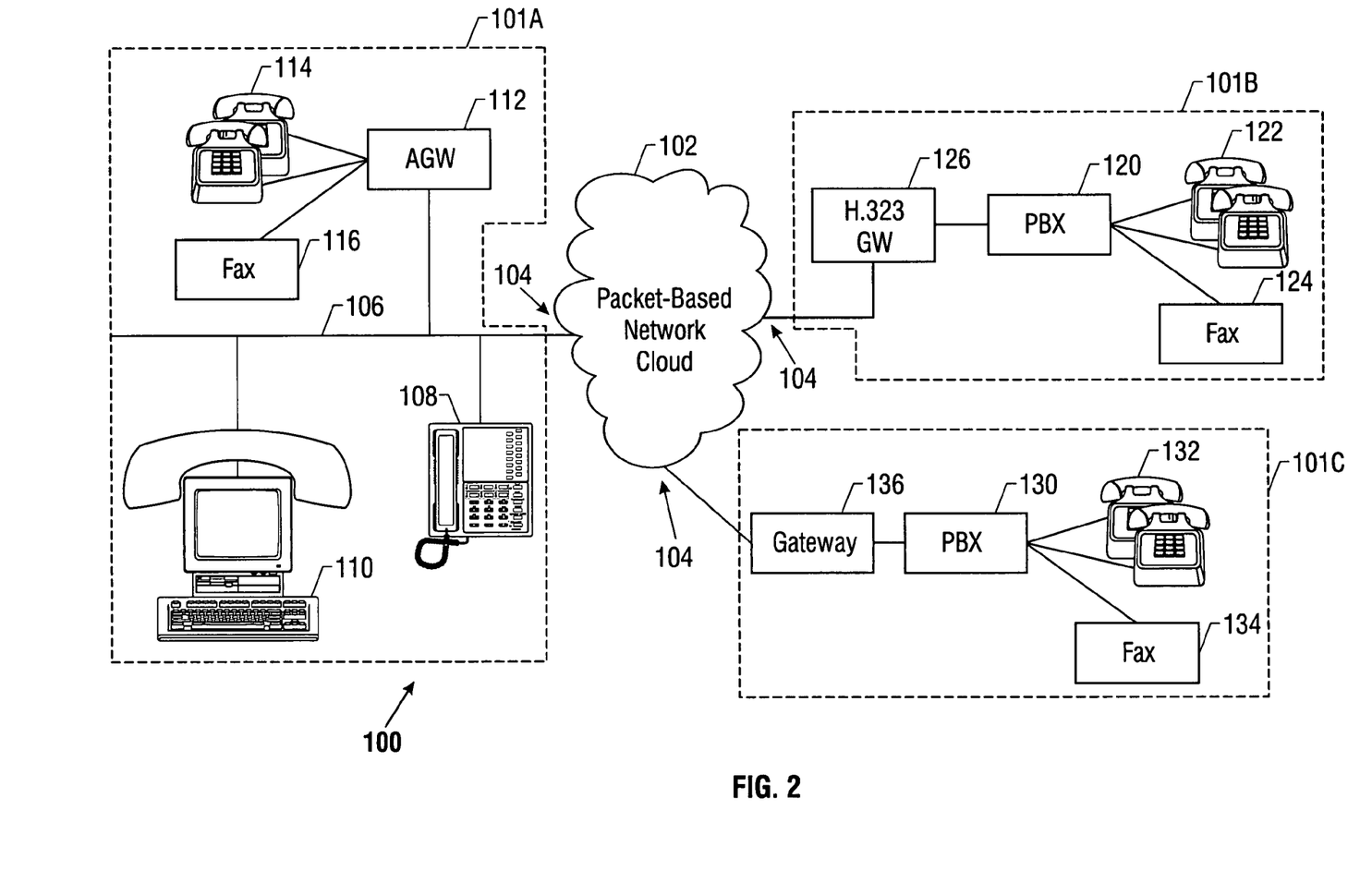
FIG. 2 illustrates a communications system including a packet-based network that may be modeled in accordance with an embodiment.
Figure 3:
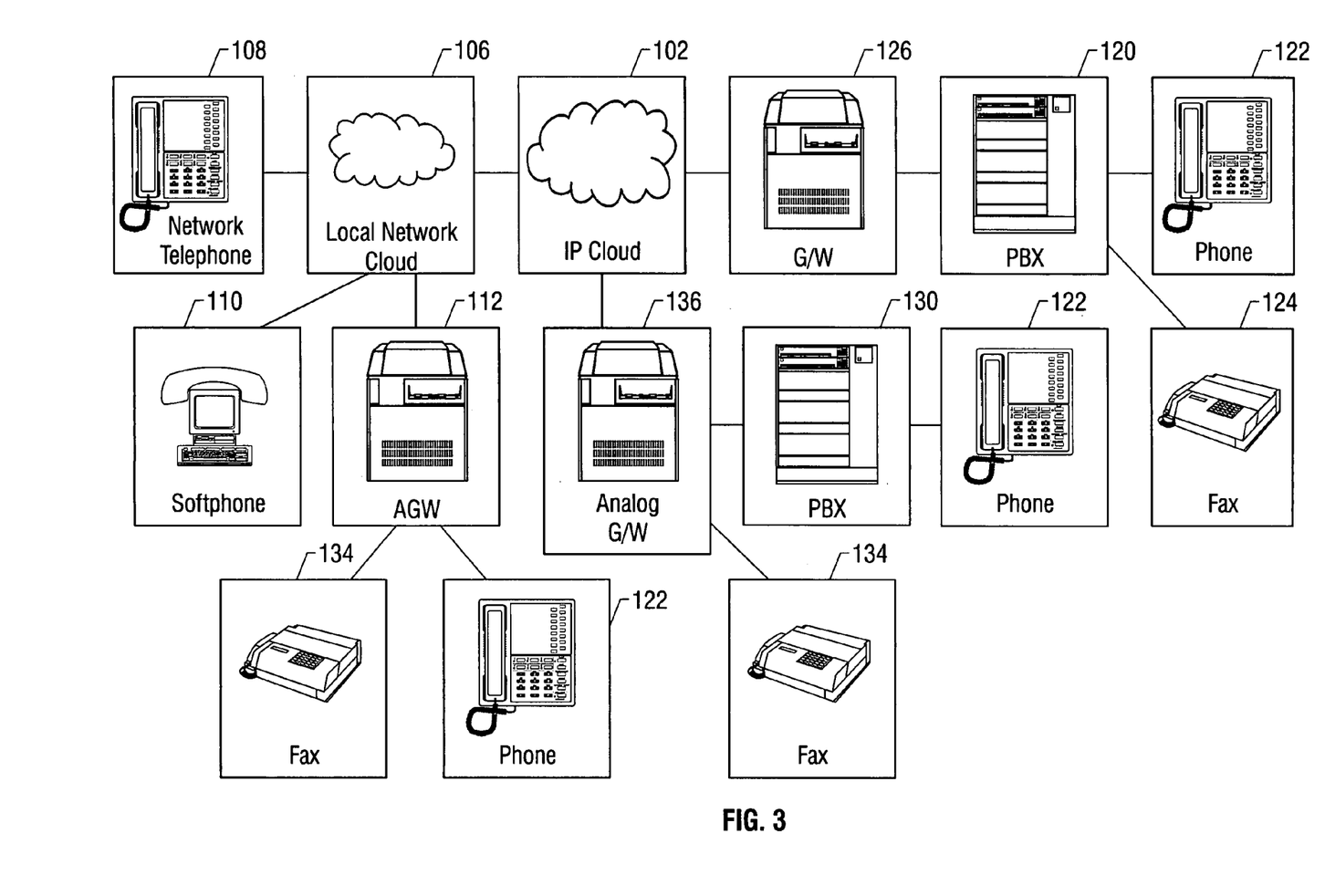
FIG. 3 illustrates linked icons representing components of the communications system of FIG. 2 that are viewable in a graphical user interface in the system of FIG. 1.

Referring to FIG. 2, an example communications system 100 that may be represented in the user interface 26 is illustrated. A representation of the communications system 100 is shown in FIG. 3. The FIG. 3 representation includes a collection of icons connected by links. The icons represent corresponding components of the communications system 100 and have the same reference numerals. By presenting the communications system 100 in a graphical user interface, use of the modeling tool is made more convenient. However, in an alternative embodiment, instead of a graphical user interface, a communications system may be modeled in a non-graphical format, such as in text format.

In the represented communications system 100, the network components include a packet-based data network cloud 102, which may be a public network such as the Internet. The data network cloud 102 may also include a private network, such as a wide area network (WAN), or a combination of public and private networks. As used here, a "network," "data network," or "data network cloud" may refer to one or more communications networks, channels, links, or paths, and systems or devices (such as routers or switches) used to route data over such networks, channels, links, or paths. The data network cloud 102 includes multiple ports 104 that may be connected to various local sub-networks (three shown in the illustrated example). A first sub-network 101A (FIG. 2) includes a packet-based local area network (LAN) 106 that may be connected to various network devices, including a network telephone 108, a softphone 110 (which is basically a computer that is fitted with voice processing capabilities), and a gateway 112 for converting between analog signals and packet data. The gateway 112 may be connected to analog telephones 114 and an analog fax machine 116. The LAN 106 may include an Ethernet network.

Another sub-network 101B (FIG. 2) includes a telephone exchange system 120 that may be coupled to digital telephony devices such as digital telephones 122 and a digital fax machine 124. The telephone exchange system 120 may include a key telephone system or a private branch exchange (PBX) system. The telephone exchange system 120 is coupled to a gateway 126 that converts between circuit-switched signaling (from the telephone exchange system 120) and packet control and data signaling that may be communicated over the data network cloud 102.

In one embodiment, communications of packets in the data network cloud 102 and the local area network 106 may be according to an Internet Protocol (IP). IP is described in Request for Comments (RFC) 791, entitled "Internet Protocol" dated September 1981. Other versions of IP, such as IPv6, or other connectionless, packet-switched standards may also be utilized in further embodiments. A version of IPv6 is described in RFC 2460, entitled "Internet Protocol Version 6 (IPv6) Specification," dated December 1998.

Another type of packet-based network includes connection-oriented networks such as Asynchronous Transfer Mode (ATM) networks or Frame Relay networks. Such networks are not illustrated in the representation of FIG. 2. However, in other represented communications systems, a sub-network that includes an ATM or Frame Relay network may also be added. Also, a wireless network may also be modeled by the modeling application 12 (FIG. 1).

A third sub-network 101C in the represented communication system 100 includes another telephone exchange system 130 coupled to telephones 132 and a fax machine 134. The telephone exchange system 130 may similarly be coupled to a gateway 136 to establish communications over the packet-based network cloud 102.

Figure 4:
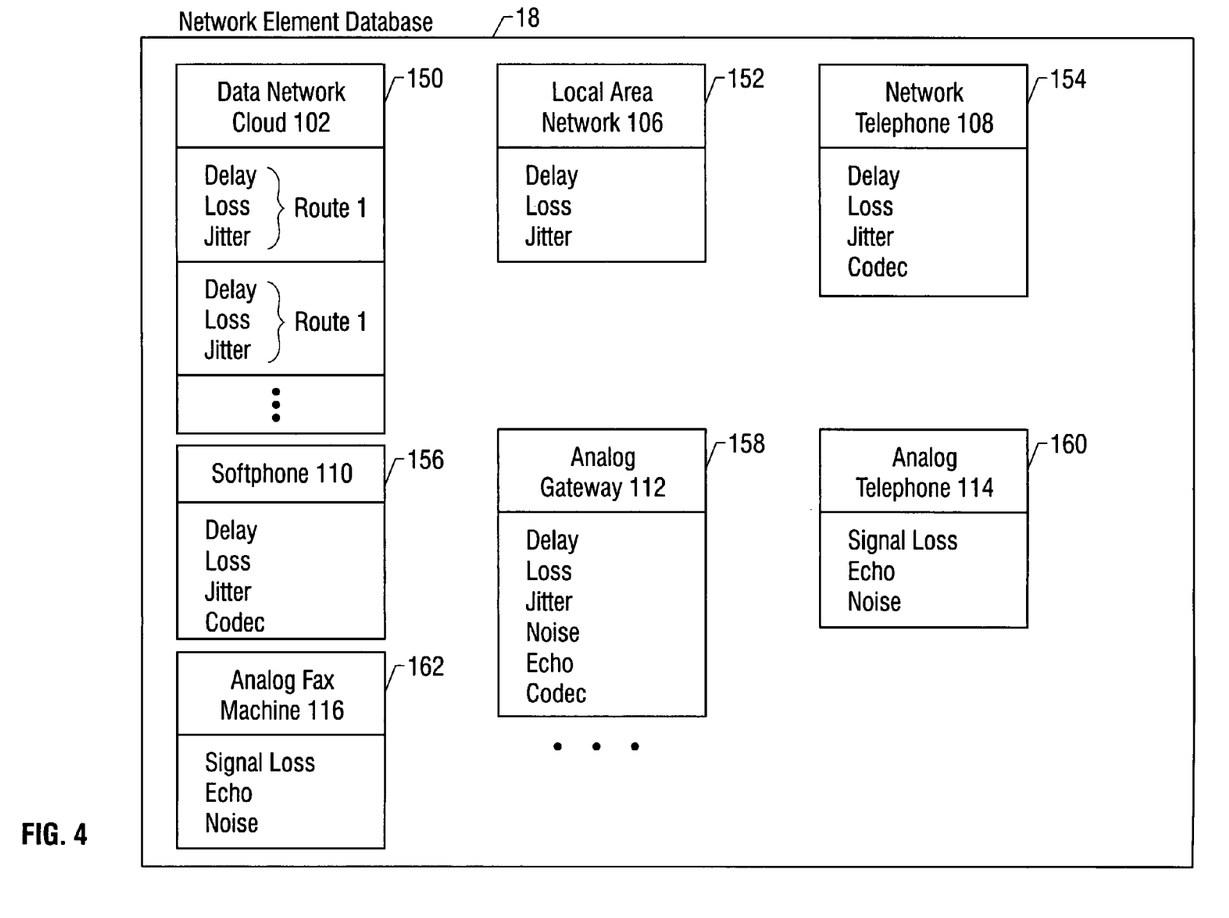
FIG. 4 is a block diagram of tables containing performance parameters associated with the components of FIG. 3.

In accordance with some embodiments, each of the network components illustrated in the represented communications system 100 may be associated with one or more performance parameters. As shown in FIG. 4, the performance parameters may be stored in corresponding tables (or other fields) in the network element database 18. For example, for the network cloud 102, the performance parameters may include packet delay, packet loss, and jitter that are stored in a table 150. Different routes may be used to couple different combinations of ports. Thus, plural sets of performance parameters may be stored in the table 150 for the plural routes.

For the local area network 106, the parameters may also include packet delay, packet loss, and jitter stored in a table 152. Similar parameters may be associated with the network devices 108, 110 and 112 in the sub-network 101A, and stored in respective tables 154, 156, and 158. In addition to packet delay, loss, and jitter, the network telephone 108 and soft phone 110 may also be associated with a parameter indicating the type of audio CODEC used. The analog gateway 112 may further be associated with analog parameters such as signal loss, echo, and acoustical or electrical noise. For the analog devices 114 and 116 in the sub-network 101A, performance parameters may include signal loss, echo, and acoustical or electrical noise, which are stored in tables 160 and 162.

The components in the other sub-networks 101B and 101C may also be associated with various performance parameters stored in other parts of the network element database 18. The gateways 126 and 136, for example, may be associated with packet delay, packet loss, and jitter. The circuit-switched components, such as the telephone exchange systems 120 and 130 and the telephony devices 122, 124, 132, and 134, may also be associated with their performance parameters.

Based on the performance parameters of the network components, the E-model routine 16 and modeling application 12 (FIG. 1) are able to calculate end-to-end perceived (subjective) voice quality (or quality of other streaming data communications) in the communications system 100. In accordance with some embodiments, the contribution of each of certain network components (such as the network cloud 102, the local network cloud 106, and other components) to each parameter (e.g., packet delay, packet loss, jitter) is assumed to be an independent random variable that can be characterized individually. Each parameter of each network component may be statistically characterized by network measurements or by use of queuing models of varying complexity. The overall end-to-end parameter value (e.g., packet delay, packet loss) is determined by combining the independent parameters of corresponding components. A similar technique is also available for non-streaming services for which appropriate models and objective parameter sets may be specified.

For the network cloud 102 and the local network 106 represented in FIGS. 2 and 3, the performance parameters (e.g., delay, loss and jitter) may be dependent upon the processing time and queuing that occur within switches and routers in the networks. Also, a transmission delay over a link adds to end-to-end packet delay within each network.

In stations or nodes such as network devices 108, 110, 112, 126, and 136, delay may be caused by processing time due to serialization, queuing, coding/decoding, packetization, and the effect of a jitter buffer. Packet loss may also be caused by a jitter buffer and coding/decoding in each station or node.

The packet size selected for carrying streaming data, such as audio data, may affect the delay through each network component. For example, audio and other forms of streaming data may be carried in Real-Time Transport Protocol (RTP) packets. RTP is described in RFC 1889, entitled "RTP: A Transport Protocol for Real-Time Applications," dated January 1996. The RTP packet size is based upon the number of frames that may be carried in each RTP packet. The RTP packet size has implications on the burden placed on network components in a given call session. Smaller network packets generally are associated with higher overhead, since more packets are communicated over the network. Larger network packets are associated with reduced overhead, but comes at the cost of longer delays since a longer speech sample is created between successive transmissions of audio or other streaming data.

The selected audio CODEC or video CODEC may also affect delays associated with communications of packets. At the originating end, an audio CODEC encodes audio signals originating from an audio input device for transmission, and at the receiving end, the audio CODEC decodes receives audio data for output to an output device. Various different types of CODECs are available that have varying levels of data compression and data transfer rate requirements. Generally, higher compression leads to a reduced amount of data so that data transfer rate requirements over a link may be reduced.

Further, in each network component, queues are provided to store received packets and packets to be transmitted. Queuing of such packets are also associated with delays. In addition, delay may result from serialization of data. Serialization delay depends on the transmission speed that is available over a link. When there are multiple packets to be transmitted, they are transmitted one at a time over the link. As a result, some delay is introduced by such serialization of packets, with such delay based on the packet size and transmission rate of the link.

Jitter refers to the variations in time for packets to arrive at a destination point. A first packet (transmitted early in time) may arrive at the destination after a later packet (from the same source) due to differences in the delays experienced by the two packets. To accommodate this packet-to-packet variation (or jitter), a jitter buffer may be used at the receiving end to collect packets. The jitter buffer allows a receiving system to wait until packets in a desired sequence have arrived. The sizes of jitter buffers and playback delay affect the packet delay and packet loss experienced in a station. A larger jitter buffer reduces the likelihood of packet loss due to jitter since more packets can be collected in the larger jitter buffer.

Packet loss rates may also be based on overrun or underrun of a decoder in an audio coder/decoder (CODEC). Underrun occurs when packets arrive slower than the ability of decoder to process them. Overrun occurs when packets arrive faster than the decoder is able to handle, resulting in loss of new packets that cannot be accommodated in the buffer.

Figure 5:
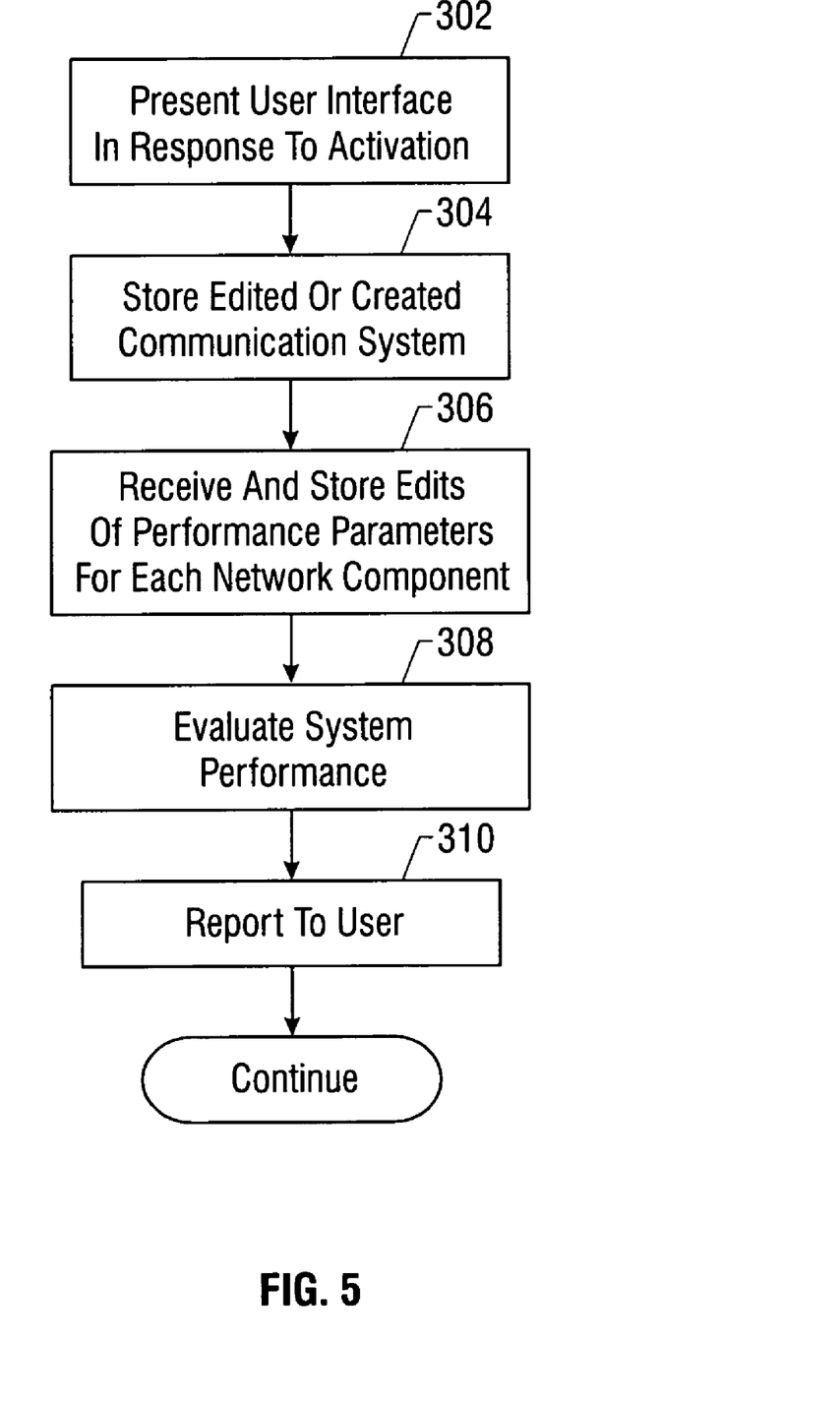
FIG. 5 is a flow diagram of a process performable by a modeling application in accordance with an embodiment.

Referring to FIG. 5, a general flow that may be performed by the modeling application 12 is illustrated. In response to user activation, the modeling application 12 may cause the user interface routine 22 to present (at 302) the user interface 26 on the display screen 24 of the system 10. Through the user interface 26, the user may manipulate an existing representation (such as the one illustrated in FIG. 3) of the communications system or the user may create a new one. The edited or created representation of the communications system can then be stored (at 304) in the network database 20 that is contained in the storage device 30. Any performance parameters of each network component that are edited may also be received and stored (at 306) in the network element database 18 contained in the storage device 30. In response to user activation, the modeling application 12 may perform a performance evaluation of the represented communications system (at 308). The modeling application 12 may call the E-model routine to derive the perceived quality for voice communications. After the evaluation has been completed, a report may be sent to the user (at 310), either through the user interface 26 or by some other mechanism (e.g., print to a network printer) through the network interface 32.

The E-model routine derives a transmission rating factor, R, which is to access the average voice quality. Other values may be derived from the R value. Examples of such other values include the mean opinion score (MOS), the percentage of users that view a connection as good or better (GOB), the percentage of users that view a connection as poor or worse (POW), and the percentage of connections that users may terminate early due to quality problems (TME).

From the above values, expected user satisfaction may be derived. The various levels of user satisfaction include "very satisfied," "satisfied," "some users dissatisfied" "many users dissatisfied," and "nearly all users dissatisfied," as illustrated in the example table below.

| User Satisfaction | R-value (lower limit) | MOS (lower limit) | GOB (lower limit) | POW (upper limit) | TME (upper limit) |
|---|---|---|---|---|---|
| Very satisfied | 90 | 4.3 | 97% | ~0% | ~0% |
| Satisfied | 80 | 4.0 | 89% | 1% | ~0% |
| Some users dissatisfied | 70 | 3.6 | 73% | 6% | 2% |
| Many users dissatisfied | 60 | 3.1 | 50% | 17% | 7% |
| Nearly all users dissatisfied | 50 | 2.6 | 27% | 38% | 19% |

Figure 6:
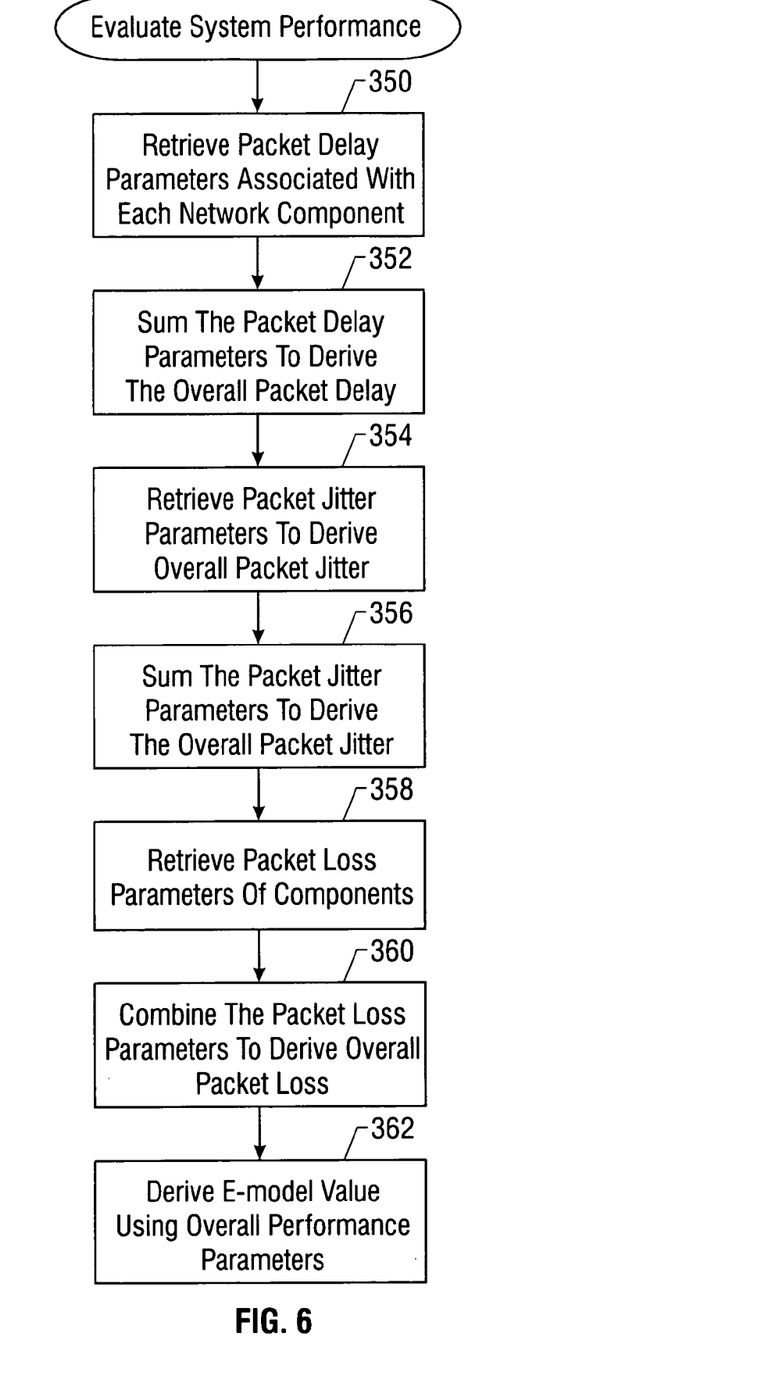
FIG. 6 is a flow diagram of a system performance evaluation process in accordance with an embodiment.

Referring to FIG. 6, an example of how the system performance of a communications system may be evaluated is shown. For a system that includes a local network (e.g., 106), a public network (e.g., 102), and a network device (e.g., 108, 110, or 112), the packet delays of each of the components may be retrieved (at 350). The overall packet delay is then derived by summing (at 352) the packet delay of the public network, the packet delay of the local network, and the packet delay of the network device. Similarly, the packet jitter of each component may also be retrieved (at 354), with the overall packet jitter being the sum (at 356) of the jitter in the public network and the jitter in the local network. The packet loss of each component may also be retrieved (at 358). The overall average packet loss may be determined by combining (at 360) the packet loss parameters associated with each of the public network, local network, and network device. Thus, if the public network has a packet loss p1 (a percentage value), the local network has a packet loss p2, and the network device has a packet loss p3, the overall packet loss p may be given by:

$$p = p1 + p2*(1-p1) + p3*(1-p2*(1-p1)) \quad \text{(Eq. 1)}$$

As additional network components with average packet losses are added, Eq. 1 above may be modified. For example, if a fourth network component is added having a packet loss parameter p4, then the overall packet loss p may be derived by adding the following term to Eq. 1: $p4*(1-p3*(1-p2*(1-p1)))$.

A multi-port public network with more than two ports, such as the data network cloud 102 in FIG. 2, may be characterized as a black box with packet delay, packet loss, and jitter between any two specified ports. The delay jitter and loss parameters may be expressed in a matrix representing the parameters between any two specified ports. Thus, a route exists between any two ports, each route including one or more paths.

Once the overall performance parameters have been derived, the E-model values, such as the ones listed above, may be calculated (at 362) from the overall performance parameters.

In a communications session between any two end points through the data network cloud 102, packets associated with the communications session may actually traverse more than one path. A given path i may occur with a measured or calculated probability pr(i). A QoS parameter for the route between point A and point B, referred to as QoS (A→B), may be derived according to the following:

$$QoS(A \rightarrow B) = \sum_{i} pr(i) * QoS(i), \quad \text{(Eq. 2)}$$

where QoS(i) is the QoS parameter for path i. The QoS parameter may be a packet delay, packet loss, packet jitter, or other performance parameter.

Some performance parameters may be related to each other within a system component, such as a network device that contains a jitter buffer. In this case, packet loss may depend on the jitter buffer size and jitter input statistics, which are the characteristics of jitter in the network. The network device jitter buffer may be modeled as a single-server G/D/1/K queue, with general arrival statistics, deterministic service and finite size. For some parameter ranges, a simplistic M/M/1/K model may approximate the buffer packet loss $p_j$:

$$p_j \sim (1-r)*(r^K)/(1-r^{K+1}), \text{ for r not equal to 1, and} \quad \text{(Eq. 3)}$$

$$p_j \sim 1/(K+1), \text{ for r equal 1,} \quad \text{(Eq. 4)}$$

where r is the jitter buffer utilization factor and K is its packet size limit. More general queuing models may account for buffer queuing in other network components, such as the network cloud 102.

As discussed above, the system 10 including the modeling tool includes various software layers, routines, or modules. Such software layers, routines, or modules are executable on the control unit 28. The control unit 28 may include a microprocessor, a microcontroller, a processor card (including one or more microprocessors or controllers), or other control or computing devices. As used here, a "controller" may refer to software, hardware, or a combination of both. The storage device 30 in the system 10 referred to in this discussion may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Instructions that make up the various software routines, modules, or layers in the system 10 may be stored in the storage device 30. The instructions when executed by the control unit 28 cause the system 10 to perform programmed acts.

The instructions of the software routines, modules, or layers may be loaded or transported to the system 10 in one of many different ways. For example, code segments including instructions stored on floppy disks, CD or DVD media, a hard disk, or transported through a network interface card, modem, or other interface device may be loaded into the system 10 and executed as corresponding software routines, modules, or layers. In the loading or transport process, data signals that are embodied in carrier waves (transmitted over telephone lines, network lines, wireless links, cables, and the like) may communicate the code segments, including instructions, to the system 10. Such carrier waves may be in the form of electrical, optical, acoustical, electromagnetic, or other types of signals.

While the invention has been disclosed with respect to a limited number of embodiments, those skilled in the art will appreciate numerous modifications and variations therefrom. It is intended that the appended claims cover all such modifications and variations as fall within the true spirit and scope of the invention.

What is claimed is:

1. A method of determining performance of a communications system, comprising:
    storing representations of plural components of the communications system, the components including a first packet-based network and at least one network device;
    assigning performance parameters for each of the components, the performance parameters comprising at least a first performance parameter and a second performance parameter;
    combining the first performance parameters of respective components to derive an overall first performance parameter;
    combining the second performance parameters of respective components to derive an overall second performance parameter; and
    deriving a quality indication of the communications system based at least on the overall first and second performance parameters,
    wherein assigning the performance parameters includes assigning a packet jitter parameter.

2. The method of claim 1, wherein the components include a second packet-based network, the method further comprising assigning performance parameters for the second packet-based network.

3. The method of claim 1, wherein assigning the performance parameters further includes assigning a packet delay parameter.

4. The method of claim 1, wherein assigning the performance parameters further includes assigning a packet loss parameter.

5. The method of claim 1, wherein storing the representations includes storing models of the plural components, the models capable of being linked to create a representation of the communications system.

6. The method of claim 5, further comprising providing a graphical user interface in which the models may be manipulated to create the representation of the communications system.

7. The method of claim 1, further comprising combining the representations of the plural components to create the communications system.

8. The method of claim 1, further comprising assigning at least one of a signal loss parameter, echo parameter, and noise parameter to at least another one of the components,
    wherein deriving the quality indication is further based on the at least one of the signal loss parameter, echo parameter, and noise parameter.

9. The method of claim 1, wherein deriving the quality indication comprises deriving a mean opinion score (MOS).

10. The method of claim 1, wherein deriving the quality indication comprises deriving a value that is representative of a subjective perceived quality of communications in the communications system by a user.

11. A method of determining performance of a communications system, comprising:
    storing representations of plural components of the communications system, the components including a first packet-based network and at least one network device;
    assigning performance parameters for each of the components, the performance parameters comprising at least a first performance parameter and a second performance parameter;
    combining the first performance parameters of respective components to derive an overall first performance parameter;
    combining the second performance parameters of respective components to derive an overall second performance parameter; and
    deriving a quality indication of the communications system based at least on the overall first and second performance parameters,
    wherein deriving the quality indication includes calculating an E-model quality rating value.

12. An apparatus for determining performance of a communications system, comprising:
    a storage device containing representations of plural components of the communications system, the plural components including a packet-based network and at least one network device, each of the components being assigned one or more performance parameters; and
    a controller to calculate a predicted quality of the communications system based on the one or more performance parameters, wherein the predicted quality comprises a value that is representative of a subjective perceived quality of communications in the communications system by a user,
    wherein the performance parameters comprise at least first and second performance parameters;
    the controller to combine the first performance parameters of respective components to derive an overall first performance parameter, and the controller to combine the second performance parameters of respective components to derive an overall second performance parameter, the controller to calculate the predicted quality based at least on the overall first performance parameter and the overall second performance parameter,
    wherein the storage device further contains a representation of a circuit-switched device.

13. An article including one or more machine-readable storage media containing instructions for modeling performance of a communications system, the instructions when executed causing a controller to:
    store models of plural components of the communications system, the plural components including a packet-based network and at least one network device, the stored models containing at least first performance parameters and second performance parameters associated with respective components, wherein the first performance parameters include packet jitter parameters;
    combine the models to represent the communications system;
    combine the packet jitter parameters of respective components to derive an overall packet jitter parameter;
    combine the second performance parameters of respective components to derive an overall second performance parameter; and determine a quality level of the communications system using at least the overall packet jitter parameter and overall second performance parameter.

14. The article of claim 13, wherein the performance parameters are associated with communications of packets through the communications system.

15. The article of claim 14, wherein the second performance parameters include at least one of a packet delay and packet loss.

16. The article of claim 13, wherein the second performance parameters include at least one of a packet delay and packet loss.

17. The article of claim 13, wherein the quality level comprises a mean opinion score (MOS).

18. An article including one or more machine-readable storage media containing instructions for modeling performance of a communications system, the instructions when executed causing a controller to:
store models of plural components of the communications system, the plural components including a packet-based network and at least one network device, the stored models containing at least first performance parameters and second performance parameters associated with respective components;
combine the models to represent the communications system;
combine the first performance parameters of respective components to derive an overall first performance parameter;
combine the second performance parameters of respective components to derive an overall second performance parameter; and
determine a quality level of the communications system using at least the overall first performance parameter and overall second performance parameter,
wherein the instructions when executed cause the controller to derive an E-model rating using the stored models.

19. A method of determining performance of a communications system, comprising:
storing representations of plural components of the communications system, the components including a first packet-based network and at least one network device;
assigning performance parameters for each of the components, the performance parameters comprising at least a first performance parameter and a second performance parameter;
combining the first performance parameters of respective components to derive an overall first performance parameter;
combining the second performance parameters of respective components to derive an overall second performance parameter; and
deriving a quality indication of the communications system based at least on the overall first and second performance parameters,
wherein combining the first performance parameters comprises combining packet delays of respective components to derive an overall packet delay, and wherein combining the second performance parameters comprises combining packet losses of respective components to derive an overall packet loss,
wherein the performance parameters further comprise packet jitter, the method further comprising combining the packet jitters of respective components to derive an overall packet jitter,
wherein deriving the quality indication is further based on the overall packet jitter.

20. A method of determining performance of a communications system, comprising:
storing representations of plural components of the communications system, the components including a first packet-based network and at least one network device;
assigning performance parameters for each of the components, the performance parameters comprising at least a first performance parameter and a second performance parameter;
combining the first performance parameters of respective components to derive an overall first performance parameter;
combining the second performance parameters of respective components to derive an overall second performance parameter;
deriving a quality indication of the communications system based at least on the overall first and second performance parameters; and
assigning an audio CODEC type parameter to at least one of the components,
wherein deriving the quality indication is further based on the audio CODEC type parameter.

21. An apparatus for determining performance of a communications system, comprising:
a storage device containing representations of plural components of the communications system, the plural components including a packet-based network and at least one network device, each of the components being assigned one or more performance parameters; and
a controller to calculate a predicted quality of the communications system based on the one or more performance parameters, wherein the predicted quality comprises a value that is representative of a subjective perceived quality of communications in the communications system by a user,
wherein the performance parameters comprise at least first and second performance parameters;
the controller to combine the first performance parameters of respective components to derive an overall first performance parameter, and the controller to combine the second performance parameters of respective components to derive an overall second performance parameter, the controller to calculate the predicted quality based at least on the overall first performance parameter and the overall second performance parameter,
wherein the value comprises an E-model quality rating value.

22. An apparatus for determining performance of a communications system, comprising:
a storage device containing representations of plural components of the communications system, the plural components including a packet-based network and at least one network device, each of the components being assigned one or more performance parameters; and
a controller to calculate a predicted quality of the communications system based on the one or more performance parameters, wherein the predicted quality comprises a value that is representative of a subjective perceived quality of communications in the communications system by a user,
wherein the performance parameters comprise at least first and second performance parameters;
the controller to combine the first performance parameters of respective components to derive an overall first performance parameter, and the controller to combine the second performance parameters of respective components to derive an overall second performance parameter, the controller to calculate the predicted quality based at least on the overall first performance parameter and the overall second performance parameter, wherein the first performance parameters comprise packet jitter parameters.

23. The apparatus of claim 22, wherein the second performance parameters include packet delays.

24. The apparatus of claim 23, wherein the packet delay of each network component is treated as an independent variable.

25. The apparatus of claim 24, wherein the controller calculates an overall packet delay of the communications system by summing the packet delays of the plural components, the overall second performance parameter comprising the overall packet delay.

26. The apparatus of claim 22, wherein the representation of the packet-based network includes a representation of a collection of links and routers.

27. The apparatus of claim 22, wherein the representation of the packet-based network includes a representation of an Internet Protocol network.

28. The apparatus of claim 22, wherein the packet-based network includes a public network, and wherein the storage device further contains a representation of a local network.

* * * * *